United States Patent
Rudolph (10) Patent No.: US 7,242,154 B2
(45) Date of Patent: Jul. 10, 2007

(54) CIRCUIT ARRANGEMENT AND METHOD FOR OPERATION OF LAMPS

(75) Inventor: Bernd Rudolph, Forstern (DE)

(73) Assignee: Patent-Treuhand-Gesellschaft für Elektrisch Glühlampen mbH, Munich (DE)

( * ) Notice: Subject to any disclaimer, the term of this patent is extended or adjusted under 35 U.S.C. 154(b) by 0 days.

(21) Appl. No.: 11/353,985

(22) Filed: Feb. 15, 2006

(65) Prior Publication Data

US 2006/0181226 A1 Aug. 17, 2006

(30) Foreign Application Priority Data

Feb. 17, 2005 (DE) .................. 10 2005 007 346

(51) Int. Cl.
*G05F 1/00* (2006.01)
(52) U.S. Cl. ....................... 315/291; 315/307
(58) Field of Classification Search ............ 315/209 R, 315/209 T, 209 CD, 209 M, 224, 225, 276, 315/283, 291, 307, 308, 360, DIG. 7
See application file for complete search history.

(56) References Cited

U.S. PATENT DOCUMENTS

| | | | | |
|---|---|---|---|---|
| 4,525,648 A | 6/1985 | De Bijl et al. | ............... | 315/224 |
| 5,170,099 A * | 12/1992 | Ueoka et al. | ................ | 315/291 |
| 5,680,017 A * | 10/1997 | Veldman et al. | ............ | 315/308 |
| 6,346,779 B1 | 2/2002 | Aiello | .......... | 315/291 |
| 6,864,645 B2 * | 3/2005 | Sun et al. | .................... | 315/308 |
| 2002/0180380 A1* | 12/2002 | Lin | .............. | 315/224 |
| 2004/0183463 A1* | 9/2004 | Sun et al. | .................... | 315/224 |
| 2005/0067981 A1* | 3/2005 | Bocchiola | .................... | 315/291 |
| 2006/0125423 A1* | 6/2006 | Chitta et al. | ................. | 315/307 |

OTHER PUBLICATIONS

Fengfeng Tao, et al., "Self-Oscillating Electronic Ballast with Dimming Control", Power Electronics Specialists Conference, 2001, IEEE, USA.

* cited by examiner

*Primary Examiner*—Trinh Dinh
*Assistant Examiner*—Tung X Le
(74) *Attorney, Agent, or Firm*—Carlo S. Bessone (57) ABSTRACT

Circuit arrangement having a free-running half-bridge inverter for operation of gas discharge lamps. A stop device is used to enable the drive to the half-bridge switches only during an on time. The oscillation frequency of the half-bridge inverter can be adjusted by the duration of the on time. This allows control of the lamp operating variables.

15 Claims, 3 Drawing Sheets

CIRCUIT ARRANGEMENT AND METHOD FOR OPERATION OF LAMPS

FIELD OF THE INVENTION

The invention relates to a circuit arrangement and to a method for operation of lamps. These are, in particular, self-oscillating half-bridge inverters whose oscillation frequency can be controlled or adjusted by means of the invention.

The invention relates mainly to the operation of low-pressure gas discharge lamps, since equipment for lamps such as these is subject to major cost pressure. Except for aspects which relate to preheating, the invention can also be applied to equipment for high-pressure gas discharge lamps. The invention is also applicable for other light sources like LEDs.

BACKGROUND OF THE INVENTION

Figure 2:
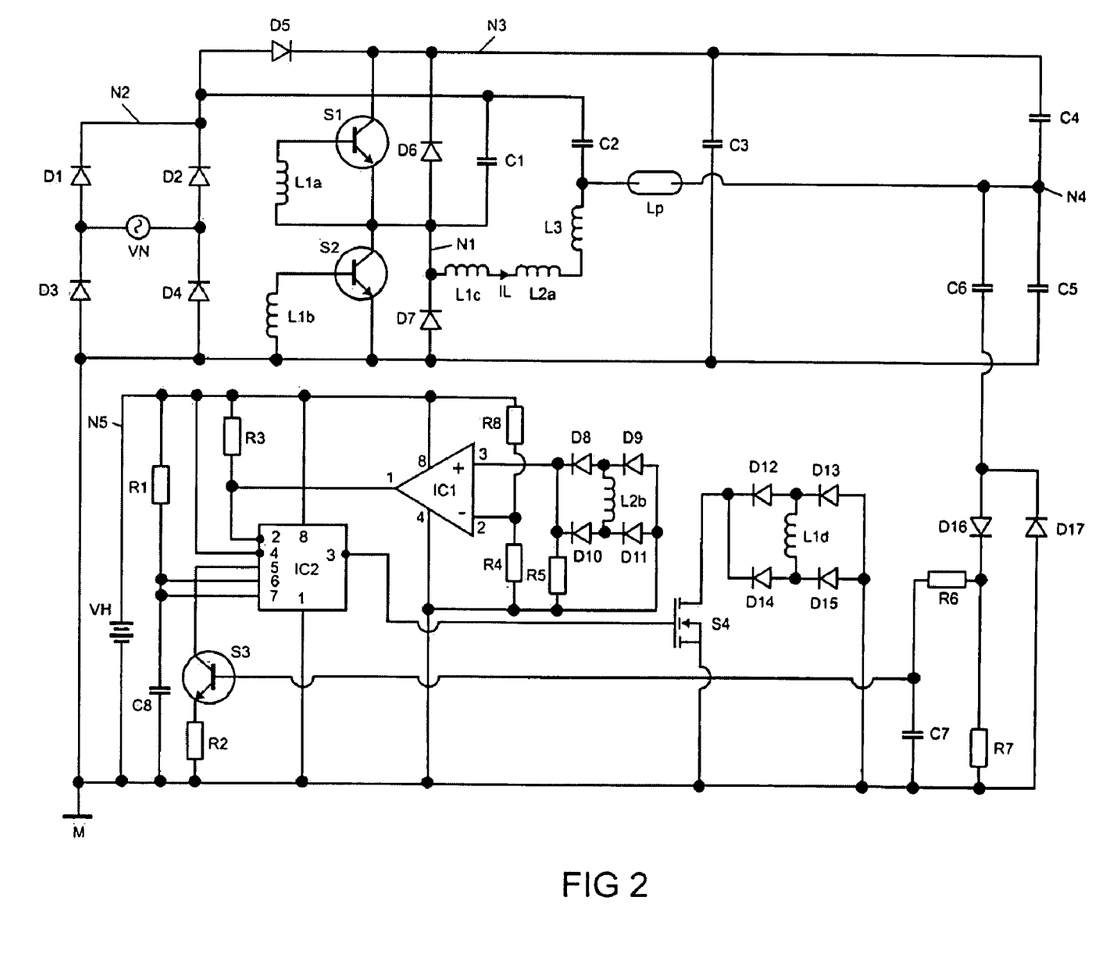
FIG. 2 shows a circuit diagram of a circuit arrangement according to the invention, with power-factor correction.

The document Fengfeng Tao, et al., "Self-Oscillating Electronic Ballast with Dimming Control", Power Electronics Specialists Conference, 2001, IEEE, USA, describes a self-oscillating half-bridge inverter. FIG. 2 in this document shows a known half-bridge inverter with a feedback transformer. The electronic switches in this document are in the form of MOSFETs.

The cited half-bridge inverter is widely used as a circuit arrangement for operation of lamps, since it requires only a small number of low-cost components, and operates reliably. One disadvantage of this circuit arrangement is due to the fact that the oscillation frequency of the half-bridge inverter is governed by the feedback device that is used and, initially, there is no capability to influence the oscillation frequency. This is the case in particular with half-bridge inverters using bipolar transistors, since bipolar transistors are driven with high currents, which are complex to influence.

A capability to adjust the oscillation frequency offers the following advantages:
  the oscillation frequency of the half-bridge inverter can be used to control the lamp current or the lamp power.
  the preheating of lamp filaments can be adjusted by means of the oscillation frequency.
  the lamp ignition process can be controlled by resonant ignition with the aid of the oscillation frequency.
  the oscillation frequency of the half-bridge inverter can be set as a function of a temperature, thus allowing the lamp power and hence the power losses to be reduced when the ambient temperature is high or the installation conditions are poor.

The first item of the above list is covered by the cited document. It is proposed that the feedback transformer be followed by a drive transformer. The oscillation frequency is now influenced by feeding a constant current to the drive transformer. The current that is fed in is superimposed on the magnetization current of the drive transformer, thus allowing the oscillation frequency to be adjusted. This solution has the disadvantage that the oscillation frequency depends on the magnetic characteristics of the drive transformer. Since these can be reduced only inaccurately, this solution is not suitable for large-scale production. Furthermore, the proposed solution does not have a closed control loop for lamp parameters such as the lamp current and lamp power.

The documents U.S. Pat. No. 4,525,648 (De Bijl) and U.S. Pat. No. 6,346,779 (Aiello) also propose self-oscillating half-bridge inverters with the capability to influence the oscillation frequency. However, once again, these documents do not disclose any control of lamp parameters such as the lamp current or lamp power.

SUMMARY OF THE INVENTION

One object of the present invention is to provide a circuit arrangement which provides a self-oscillating half-bridge inverter for operation of lamps, in which the oscillation frequency can be adjusted reliably.

A further object of the present invention is to provide a self-oscillating half-bridge inverter for operation of lamps, in which one lamp parameter can be controlled by adjustment of the oscillation frequency.

A further object of the present invention is to specify a method which covers the starting and operation of a lamp with the aid of a circuit arrangement which contains a self-oscillating half-bridge inverter, with the starting process including at least controlled ignition of the lamp.

The solution according to the invention for the objects mentioned above essentially comprises the circuit arrangement including a stop device, which can prevent the electronic switches in the half-bridge inverter from being switched on, and allows them to be switched on only during an on time. The on time is advantageously dependent on a lamp parameter, thus allowing a control loop to be closed.

In detail, a circuit arrangement according to the invention includes the following features;
  a half-bridge arrangement which has an upper and a lower electronic switch which are connected in series, each have a control connection and form a central point at their junction point,
  a load circuit, in which a load current flows, is connected to the central point,
  the load circuit contains a reactance network with a resonant frequency, to which a lamp can be connected,
  the load circuit is designed such that, during normal operation for a connected lamp and after opening of one electronic switch, the voltage across the respective other electronic switch becomes zero after a ringing time,
  the circuit arrangement has a feedback device, which couples a feedback variable from the load circuit to the control connections of the electronic switches in such a way that the electronic switches are switched on alternately,
  the circuit arrangement has a stop device which is coupled to the control connections of the electronic switches and has one input to which a stop signal is applied, with the stop device preventing the electronic switches from being switched on for as long as the stop signal is in the off state,
  the circuit arrangement has a timer which is coupled to the input of the stop device and produces a stop signal, which can assume an on state and the off state,
  the circuit arrangement has a trigger device which in each case emits a trigger signal to the timer after the ringing time has elapsed, but at the latest when the load current becomes zero.

The load circuit which is connected to the central point generally has a lamp inductor and a resonant capacitor. These components and other components of the reactance network are matched to one another such that they reduce the switching-on load on the electronic switch that has in each case been switched on during a switching process. This is achieved in that, after an electronic switch has been switched off, the charge included in the energy in an inductor, such as the lamp inductor, capacitances, such as parasitic switch capacitances or so-called snubber capacitances, is changed in order to produce a voltage which is ideally zero across the respective electronic switch which is intended to be switched on. This voltage is generally clamped by means of so-called freewheeling diodes. This process takes place reliably for a circuit arrangement only when the circuit arrangement is being operated in a normal mode. This means that the circuit arrangement is not in a transitional state at that time as initiated, for example, by disconnection of a lamp or a flashover in a lamp. From the time at which an electronic switch is switched off to the time at which the voltage across the other electronic switch becomes zero defines a ringing time. After the ringing time, the electronic switch can be switched on without any voltage, and thus without any load.

The feedback device generally comprises magnetic coupling of a feedback variable from the load circuit to the control connections of the electronic switches. A current transformer is widely used for this purpose, whose primary detects the load current and which in each case has a secondary winding to control the electronic switches. It is also known for the primary winding to be connected to the lamp inductor. Furthermore, embodiments are also known in which a load voltage is detected for feedback, rather than the load current.

All of these circuits have the common feature that the feedback variable ideally switches an electronic switch on off load and maintains this switched-on state in a positive feedback loop until no feedback variable is any longer passed to the control input of the electronic switch. The prior art essentially considers two mechanisms for this purpose: resonant processes in the load circuit reverse the polarity of the feedback variable, or the feedback device interrupts the transmission of the feedback variable, for example by saturation of a feedback transformer.

According to the invention, the time at which the electronic switches are switched on and off is no longer governed substantially by the feedback device. It admittedly still supplies energy to drive the electronic switches, but a stop device defines an on time, which is the only time in which the electronic switches can be driven. According to the invention, the on time can be used to determine the oscillation frequency of the half-bridge inverter.

A timer controls the stop device, via an input at which the timer feeds in a stop signal. As long as the timer is transmitting the stop signal in an off state, this prevents the electronic switches from being driven by the feedback device. A circuit arrangement according to the invention advantageously has only one stop device, which acts in the same way on both electronic switches in the half-bridge arrangement. During the on time, the timer transmits the stop signal in an on state, thus allowing the electronic switches to be driven by the feedback device.

The start of the on time is determined by a trigger device with the aid of a trigger signal, which it sends to the timer. As soon as the timer receives a trigger signal, it switches the stop signal to the on state for the duration of the on time. The trigger device derives the trigger signal from characteristic variables of the load circuit. The earliest time for transmission of a trigger signal is the end of the ringing time, as described above. After this time, that electronic switch which is the next that is intended to carry the load current in the half-bridge arrangement can be switched on without any load. This time is followed by a freewheeling phase in which the load current is carried by the freewheeling diodes mentioned above. The freewheeling phase ends when the polarity of the load current changes, that is to say when a load current zero crossing occurs. After the zero crossing, the electronic switch has to carry the load current. If discontinuous operation is not intended, the trigger device must send a trigger signal to the timer at the latest by this time. In summary, the trigger signal should be sent in the freewheeling phase. In this case, it should be noted that the conductive losses after switch-on are not immediately optimum owing to the so-called dynamic saturation voltage of bipolar transistors. The trigger signal should therefore be sent a certain time before the end of the freewheeling phase, in order to reduce the transistor losses.

As stated, the oscillation frequency of the half-bridge inverter can be adjusted by means of the on time. If the aim is to control an electrical output variable of the circuit arrangement, such as the lamp power or the lamp current, the on time is advantageously dependent on the variable to be controlled. This variable is in general detected by a measurement device, and is passed as a controlled variable to the timer. The timer sets the on time as a function of the controlled variable, thus closing a control loop. If the lamp current rises, for example, then the timer shortens the on time, so that the oscillation frequency of the half-bridge inverter rises, and reduces the lamp current again.

The control loop which has been mentioned may be closed, however, only during lamp operation. Lamp operation, in which a connected lamp is being operated correctly, is preceded by a starting mode. The starting mode is necessary in order to start a gas discharge in the lamp, and includes at least one ignition mode, in which an ignition voltage is produced across the lamp.

The control loop cannot operate in the starting mode, since no worthwhile controlled variable is available. A selection switch is therefore advantageously added to the circuit arrangement according to the invention, and is controlled by a sequence controller. The sequence controller initially sets the selection switch to the starting mode, such that the input of the timer which is responsible for setting the on time is coupled to a first device for time presetting. The first device for time presetting uses the timer to define a fixed on time, which is chosen such that an ignition voltage is produced across a connected lamp which has not been ignited, with this ignition voltage being suitable to ignite the lamp. The resonant frequency of the reactance network is preferably stimulated in order to produce the ignition voltage. In the simplest case, this is the resonant frequency of the series circuit comprising the lamp inductor and a resonant capacitor. When the oscillation frequency of the half-bridge inverter matches the resonant frequency of the reactance network, then one electronic switch carries the load current for in each case one quarter of the period duration of the resonant frequency. If the on time is counted from the zero crossing of the load current, then the half-bridge inverter oscillates at the resonant frequency if the on time is one quarter of the period duration of the resonant frequency. If the trigger signal is sent even before the zero crossing of the load current, then the on time is lengthened in a corresponding manner. This analysis ignores storage times in bipolar transistors which are used in the half-bridge arrangement. The on time may need to be shortened by the storage time. In order to reduce the switching loads on the electronic switches, the half-bridge inverter must be operated in the so-called inductive mode. This means that the oscillation frequency of the half-bridge inverter must be higher than the resonant frequency. Accordingly the on time must also be chosen to be shorter than would be necessary to reach the resonant frequency precisely.

The closer the oscillation frequency of the half-bridge inverter is to the resonant frequency, the higher is the resultant ignition voltage. However, the circuit arrangement load capacity represents a limit as to how close the oscillation frequency may be to the resonant frequency. In order to achieve as high an ignition voltage as possible without overloading the circuit arrangement, the current through the half-bridge arrangement or the load current is detected by a threshold value device. If the detected current exceeds a current limit value, then the threshold value device produces an interrupt signal, which is supplied to an interrupt input of the timer. The interrupt input of the timer is designed such that the on time is terminated immediately, as soon as the timer receives an interrupt signal. This means that the timer changes the stop signal to the off state immediately. This means that the oscillation frequency can come only as close to the resonant frequency as the load capacity of the circuit arrangement allows and, on the other hand, that this load capacity limit is also raised in order to achieve as high an ignition voltage as possible.

In addition to the ignition mode, the starting mode may also include a preheating mode. The aim of the preheating mode is to raise the electrode filaments of a connected lamp to a temperature at which ignition can take place in a manner which protects the filament, before the ignition mode. For this purpose, before the ignition mode, the sequence controller sets the selection switch such that a second device for time presetting is coupled to the timer. The timer is thus caused to set a fixed on time which is suitable for preheating of the electrode filaments. This on time must result in an oscillation frequency which is so far away from the resonant frequency that it is impossible for a voltage which would lead to ignition to be applied to the lamp. Experiments have shown that this is the case when the oscillation frequency is more than 1.5 times the resonant frequency.

The present invention is particularly advantageous when using bipolar transistors in the half-bridge arrangement. There are two reasons for this: firstly, bipolar transistors cost less than equivalent electronic switches such as MOSFETs or IGBTs. Secondly, a high current must be available to drive bipolar transistors. In the case of the present invention, this problem is solved by drawing the current for driving the bipolar transistors from the load circuit. Nevertheless, the circuit arrangement according to the invention allows lamp operating variables to be controlled by means of the oscillation frequency.

Recently emerging high power LEDs (Light Emitting Diodes) have operating currents well above 0, 1 A. Therefore the present invention becomes important also for LED power supplies. Thus the expression "lamp" also includes LEDs in the present invention.

BRIEF DESCRIPTION OF THE DRAWINGS

The invention will be explained in more detail in the following text using exemplary embodiments and with reference to the drawings, in which.

In the following text, resistors are denoted by the letter R, electronic switches by the letter S, diodes by the letter D, capacitors by the letter C, nodes by the letter N, transformers by the letter T and inductors and windings by the letter L, in each case followed by a number. In addition, the following text always uses the same reference symbol for identical elements and elements having the same effect in the various exemplary embodiments.

DETAILED DESCRIPTION OF THE INVENTION

Figure 1:
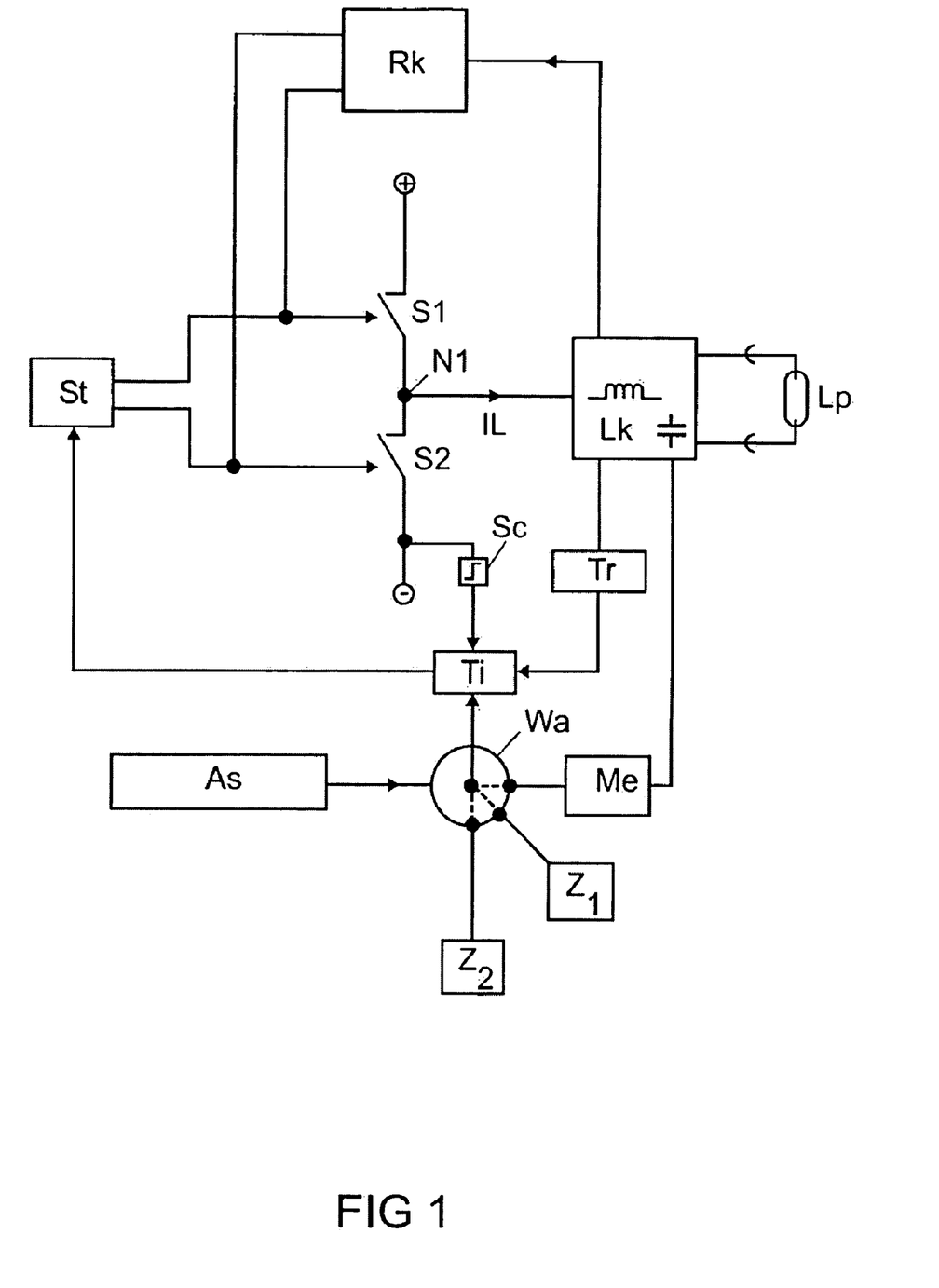
FIG. 1 shows a block diagram of a circuit arrangement according to the invention.

FIG. 1 shows a block diagram of a circuit arrangement according to the invention. An upper and a lower electronic switch S1, S2 are connected in series and form a half-bridge arrangement. At their junction point, S1 and S2 form a central point N1, to which a load circuit Lk is connected, in which a load current IL flows. Freewheeling diodes in parallel with S1 and S2 have not been illustrated, for the sake of clarity. The load circuit Lk contains a reactance network with one resonant frequency, to which a lamp Lp can be connected. The reactance network is schematically represented by an inductor and a capacitor. The reactance network is necessary in order to match the source impedance of the half-bridge arrangement to the load impedance which is formed by the lamp Lp. Gas discharge lamps require a power supply which has the character of a current source, while the half-bridge arrangement is fed from a voltage source, as is indicated by the circled plus and minus signs.

A feedback device Rk ensures oscillation, that is to say that S1 and S2 are switched on and off alternately. This feedback device Rk draws energy from the load circuit Lk and supplies it to the control inputs of the electronic switches S1, S2. The feedback device Rk is generally a transformer, although capacitive feedback is also possible.

According to the invention, the circuit arrangement has a stop device St which, in FIG. 1, is connected in parallel with the feedback device Rk to the control inputs of the electronic switches S1, S2. The stop device St can thus prevent S1 and S2 from being driven, by short-circuiting of the control signals. This effect of the stop device St can also be achieved in a different way, for example by short-circuiting of the input of the feedback device Rk, or by disconnection of the inputs or outputs of the feedback device Rk. Particularly in the case of bipolar transistors, it is advantageous to short-circuit the control signals since this is associated with quicker switching off and a better blocking response. The stop device St does not necessarily need to act on the control inputs S1 and S2. For example, it can act via a MOSFET on the emitter of a bipolar transistor, and this is referred to as a cascode circuit.

The stop device St has an input via which it is controlled by a timer Ti. The timer Ti supplies a stop signal which can assume an on state and an off state. When a stop signal in the off state is applied to the stop device St, then the outputs of the stop device St prevent S1 and S2 from being driven.

The timer Ti has three inputs. One input is connected to a trigger device Tr. As soon as the trigger device sends a trigger signal to the timer Ti, the timer Ti emits a stop signal in the on state to the stop device St for the duration of an on time, and then changes back to the off state. The function of the timer Ti can accordingly be carried out by means of a monostable multivibrator. However, it is also possible for this function to be provided by software in a microcontroller.

As explained above, the trigger Tr has to produce a trigger signal within the freewheeling phase. For this purpose, it is coupled to the load circuit. The trigger signal can now be derived either from the load current IL, from the voltage at N1 or from variables which are derived from them by comparison with a comparison variable, in a known manner.

A second input of the timer Ti is coupled to a threshold value device Sc. The threshold value device Sc sends an interrupt signal to the timer Ti, causing the timer Ti to immediately switch the stop signal to the off state. S1 and S2 are thus switched off before the on time has elapsed. This prevents the oscillation frequency from falling into a range in which major resonant current and voltage peaks occur. This function can be provided by a reset for the monostable multivibrator mentioned above. Once again, this can also be achieved by software in a microcontroller. In FIG. 1, the threshold value device Sc compares the current in the switch S2 with a predetermined reference value. If this is exceeded, then the threshold value device Sc sends an interrupt signal. The input of the threshold value device Sc may, however, also use other electrical variables in the load circuit for detection of severe resonance. For example, the voltage across the lamp terminals may be used for this purpose.

The on time can be adjusted via the third input of the timer Ti. A selection switch Wa is controlled by a sequence controller As. The position of the selection switch Wa determines which device in the circuit arrangement will define the on time.

The timer Ti may also have a further option for adjusting the on time, which is dependent on the temperature. If a measured temperature exceeds a predetermined value, the on time can thus be shortened, thus leading to reduced lamp power and thus to reduced power losses in the circuit arrangement. This therefore makes it possible to prevent a circuit arrangement failure resulting from overheating. The temperature dependency of the lamp power can also be used to optimize the lamp power with respect to the lamp efficiency for given temperature conditions.

When the circuit arrangement is being started up, the sequence controller As sets the selection switch Wa to a position in which a second device for time presetting Z2 is coupled to the third input of the timer Ti. A fixed on time is thus set, in which electrode filaments can be preheated. This preheating mode can be maintained for a fixed preheating time of about one second by the sequence controller As. The sequence controller can also be fed with data relating to the state of the electrode filaments, thus allowing the preheating time to be controlled.

After the preheating time, the sequence controller As changes to the ignition mode for the duration of an ignition time. In the ignition mode, the selection switch Wa couples a first device for time presetting Z1 to the third input of the timer Ti. This results in an on time which results in an oscillation frequency close to the resonant frequency. An ignition voltage is then set at the lamp terminals, whose level is controlled, if required, by the threshold value device Sc. The sequence controller As can either predetermine the fixed ignition time, or can end it with the aid of a detection device for lamp ignition.

After the ignition mode, the sequence controller As changes to lamp operation. For this purpose, the selection switch Wa is moved to a position which couples the third input of the timer Ti to a measurement device Me. This closes a control loop for a controlled variable which is detected by the measurement device Me. This controlled variable may, for example, be the lamp current or the lamp power. Variables which are dependent on these variables are also suitable for use as the controlled variable, of course. The measurement device Me can apply a known control characteristic, such as PID, to the controlled variable.

Finally, sequence controller As can also move the selection switch Wa to a position in which an on time with the value zero is preset for the timer Ti. The half-bridge inverter then does not operate. This function can be used in fault states.

FIG. 2 shows a circuit diagram of a circuit arrangement according to the invention with power-factor correction. The power-factor correction is provided by means of a charge pump. From the technical point of view, the charge pump is of secondary importance for the present invention. Since the present invention as well as the charge pump results in cost advantages over other circuits, their combination is advantageous from the financial point of view. A technical explanation of a charge pump can be found in the document EP 1 443 807 (Rudolph).

In the example shown in FIG. 2, the circuit arrangement is connected to a mains voltage VN which supplies energy for the lamp. A full-wave rectifier comprising the diodes D1, D2, D3 and D4 provides the rectified mains voltage between a node N2 and a reference node M. A pump diode D5 connects N2 to a node N3 at which a supply voltage is available with respect to the reference node M for a half-bridge inverter. An energy storage capacitor C3 is connected between N3 and M, and is used to stabilize the supply voltage.

A half-bridge arrangement comprising two electronic switches S1 and S2 connected in series is connected between N3 and M. S1 is connected to N3 and represents an upper electronic switch; S2 is connected to M and represents the lower electronic switch. One freewheeling diode D6 or D7 is respectively connected in parallel with S1 and S2. The node N1, which forms the central point of the half-bridge arrangement, is located at the junction point between S1 and S2. A snubber capacitor C1 is connected between N1 and N2 and contributes to the charge pump mentioned above.

Two coupling capacitors C4, C5 are also connected in series between N3 and M, with their junction point forming a node N4. One of the capacitors C4 and C5 may be omitted if there are no requirements for the circuit arrangement to be balanced.

The half-bridge arrangement produces a square-wave AC voltage, at a higher frequency than the mains frequency, between N1 and N4 for operation of a lamp Lp. That connection of the lamp Lp which is remote from N4 is connected to the node N2 via a resonant capacitor C2. The resonant capacitor C2 also contributes to the charge pump.

Three inductive components are connected in series, in series with the lamp: a lamp inductor L3, the primary winding L1c of a feedback transformer Ti and the primary winding of L2a of a current transformer T2. The reactance network is formed by L3 together with C2. In the present example, the load circuit contains only the coupling capacitors C4 and C5 in addition to the reactance network. In addition, the load circuit may also include means for preheating of electrode filaments and for ignition.

The feedback transformer T1 has two secondary windings L1a and L1b, which are respectively coupled to the control inputs of the electronic switches S1 and S2. In the present example, L1a and L1b are respectively connected in parallel with the base-emitter junctions of S1 and S2. The winding sense of the windings of T1 is chosen such that the feedback formed by T1 results in a steady-state oscillation of the half-bridge arrangement. Means for starting the oscillation are known, and will not be described.

In addition to the three described windings on T1, T1 has a fourth winding L1d, which is coupled to the AC voltage connections of a full-bridge rectifier which is formed by diodes D12, D13, D14 and D15. The DC voltage connections of this rectifier are connected in parallel with an electronic switch S4. L1d, the rectifier and S4 form a stop device. S4 is an MOSFET, whose source connection is connected to the reference ground potential M. As soon as a stop signal which corresponds to an off state is applied to the gate of S4, S4 short-circuits via the rectifier L1d. The control inputs of the electronic switches S1 and S2 are thus also short-circuited, and thus switched off, via T1.

S4 is controlled by a timer IC2. The widely used timer circuit 555 can be used for IC2. IC2 produces the stop signal at the pin 3. In order to achieve the correct polarity for driving S4, the signal at the pin 3 must be inverted. This is annotated by a large dot, in the general normal manner.

A voltage source VH is provided between a node N5 and the reference ground potential M, in order to supply energy to IC2. This voltage source may be in the form of a separate power supply unit, which draws its energy from the mains voltage VN. It is also normal for the half-bridge inverter in the circuit arrangement to be extended such that a supply voltage can be provided for IC2. The pin 8 of IC2 is connected to N5, and the pin 1 is connected to the reference ground potential M, in order to supply energy to IC2.

The series circuit formed by a resistor R1 and capacitor C8 forms a time constant which is connected between N5 and M. The junction point between R1 and C8 is connected to pin 6 and pin 7 of IC2, in order to preset a time constant for the timer. Pin 4 forms a reset input, and must be connected to the positive operating voltage for IC2 in order to achieve the desired functionality of IC2.

Pin 2 of IC2 forms a trigger input, and is first of all connected via a resistor R3 to N5. A negative pulse is required at pin 2 in order to initiate the timer. This is supplied from IC1. IC1 is an operational amplifier used as a comparator and, by way of example, LM293 module may be used for this purpose. At pin 1 of IC1, the trigger pulses are supplied at pin 2 of IC2. Pin 8 and pin 4 of IC1 are used for supplying power, and are connected to N5 and M. Pin 2 of IC1 forms the inverting input, and is connected to N5 via a resistor R8, and to M via a resistor R4. The values of R4 and R8 are chosen such that essentially the reference ground potential M is applied to the pin 2.

The non-inverting input of IC1 is fed with the DC voltage output of a full-bridge rectifier, which is formed by diodes D8, D9, D10 and D11. The secondary winding L2b of the current transformer T2 is connected to the AC voltage input of this full-bridge rectifier. The DC voltage output of the full-bridge rectifier is terminated with a low impedance by a resistor R5. A voltage which is proportional to the rectified load current is thus applied to the non-inverting input of IC1. At the zero crossing of the load current, the voltage at the inverting input of the IC1 is briefly higher than the voltage at the non-inverting input. This results in a negative trigger pulse at the pin 1 of the IC1. IC1, R4, R5, R8, D8, D9, D10, D11, L2a and L2b thus form the trigger device. As soon as a zero crossing occurs in the load current, the timer is triggered and switches off the transistor S4 for the on time, thus allowing S1 and S2 to be driven.

The duration of the on time is set via pin 5 of the timer, to which the collector of the bipolar transistor S3 is connected. The emitter of S3 is connected to M via a resistor R2. The base of S3 is driven by the potential of a capacitor C7, which is proportional to the lamp current. The information about the lamp current level is tapped off at the node N4, where the capacitors C4, C5 and C6 form a capacitive current divider. The positive half-cycle of the component of the lamp current through C6 is passed via a diode D16 to a measurement resistor R7, and is integrated on C7, via a resistor R6. The negative half-cycle of the lamp current C6 flows through a diode D17, which is connected in parallel with D16 and R7.

As soon as the lamp current now rises, the voltage at C7 rises. S3 is thus driven more strongly, as a result of which pin 5 of IC2 is connected to the reference ground potential M with a lower resistance value. This leads to a reduction in the on time, and thus to an increase in the oscillation frequency of the half-bridge arrangement. Because of the lamp inductor L3, the higher oscillation frequency results in a falling lamp current thus closing the control loop.

The block diagram in FIG. 1 discloses a sequence controller which is used to provide preheating and ignition for the lamp. This is not illustrated in the exemplary embodiment shown in FIG. 2. A person skilled in the art can implement this sequence controller by using a microcontroller, without any inventive step. The timer may also be formed by the micro-controller.

In addition, FIG. 2 does not show the threshold value switch which limits the ignition voltage.

Figure 3A:
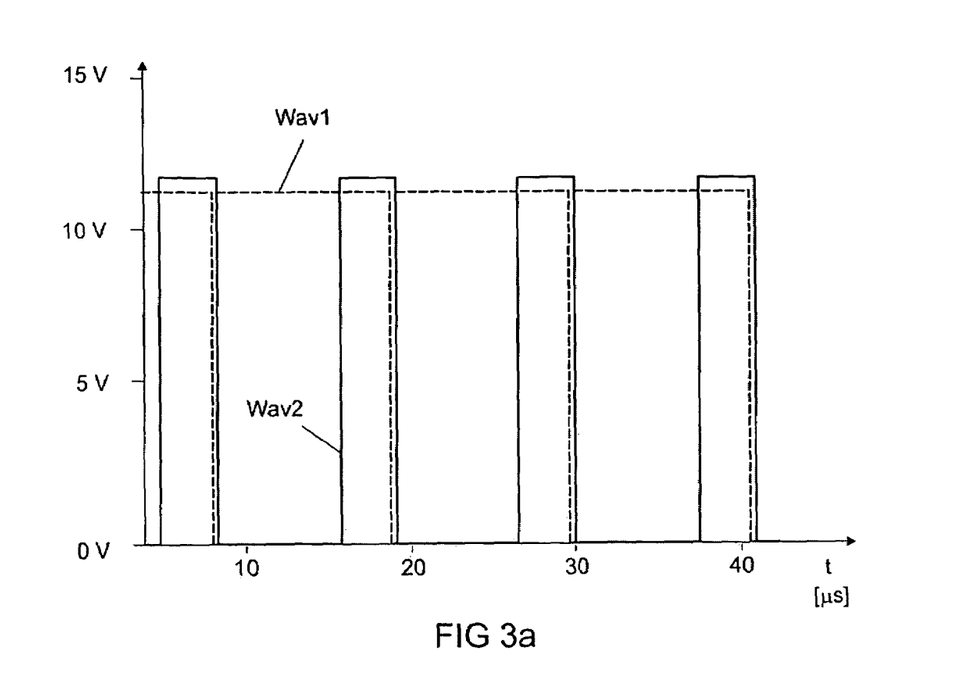
FIG. 3a shows the waveform of characteristic voltage waveforms for a circuit arrangement according to the invention.
Figure 3B:
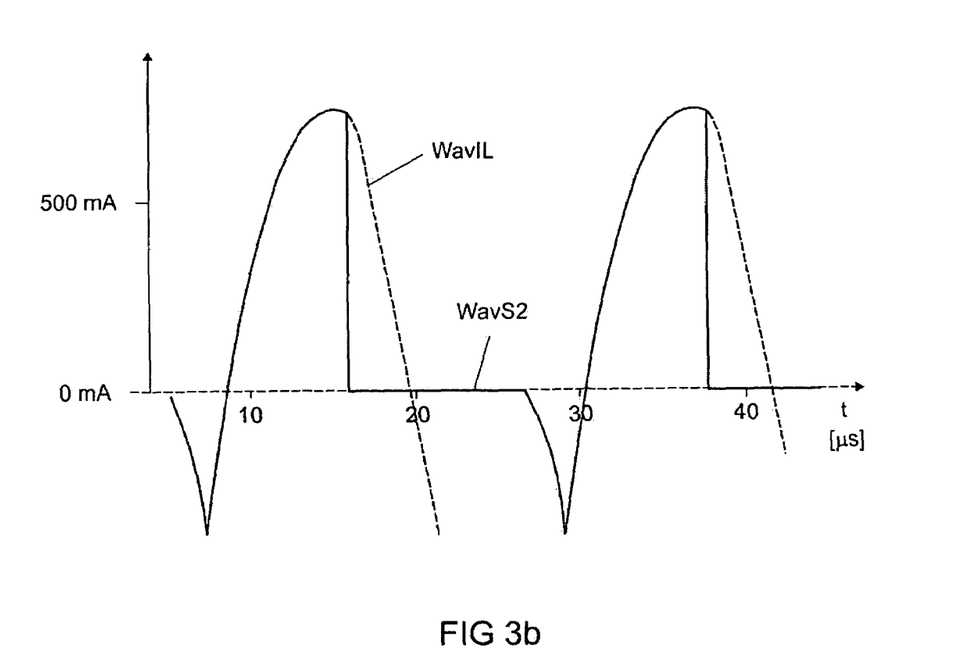
FIG. 3b shows the waveform of characteristic current waveforms for a circuit arrangement according to the invention.

FIGS. 3a and 3b show the waveform of characteristic operating variables of a circuit arrangement according to the invention as shown in FIG. 2. FIG. 3a shows the waveform of the trigger signal Wav1 and of the stop signal Wav2.

The trigger signal Wav1 is produced at the output of the IC1. The trigger signal Wav1 is at the value of the voltage source VH of 12 V in a rest state. As soon as the load current becomes approximately zero, a trigger event is indicated by the trigger signal Wav1 becoming zero for a short time. The trigger signal Wav1 can thus be assessed as being active when it becomes zero. This is justified by the fact that the trigger input 2 of the IC2 is inverted.

The trigger event initiates the stop signal Wav2 changing to the on state. In the exemplary embodiment shown in FIG. 2, the on state occurs only when the stop signal Wav2 has the value zero. After an on time of approximately 7.3 microseconds, the stop signal changes to the off state, which in the example corresponds to a voltage level of 12 volts. Overall, the half-bridge inverter oscillation frequency of about 46 kHz can be read.

FIG. 3b shows a waveform WavS2 of the collector current S2 and the waveform WavIL of the load current IL. The load current WavIL and the switch current WavS2 are coincident during the on time during every alternate period of the stop signal Wav2. The load current WavIL is coincident with the switch current of S1 which is not illustrated, during the on time in the intermediate periods.

As can clearly be seen, the switch current terminates abruptly at the end of the on time, since the drive for S2 is interrupted by the stop signal changing to the off state. The load current WavIL continues to flow, however, during the subsequent ringing time and freewheeling phase. The freewheeling phase is characterized by the negative switch current WavS2. Despite the freewheeling diodes, a negative collector current flows through the forward-biased collector-base diode of S2.

This clearly shows how a trigger pulse for the trigger signal Wav1 is initiated towards the end of the freewheeling phase.

The invention claimed is:

1. A circuit arrangement for operation of lamps (Lp) having the following features:
   a half-bridge arrangement which has an upper and a lower electronic switch (S1, S2) which are connected in series, each have a control connection and form a central point (N1) at their junction point, a load circuit (Lk), in which a load current (IL, WavIL) flows, is connected to the central point (N1), the load circuit (Lk) contains a reactance network with a resonant frequency, to which a lamp (Lp) is connected, the load circuit (Lk) is designed such that, during normal operation for a connected lamp (Lp) and after opening of one electronic switch (S1, S2), the voltage across the respective other electronic switch (S1, S2) becomes zero after a ringing time, the circuit arrangement has a feedback device (Rk), which couples a feedback variable from the load circuit (Lk) to the control connections of the electronic switches (S1, S2) in such a way that the electronic switches (S1, S2) are switched on alternately, the circuit arrangement has a stop device (St) which is coupled to the control connections of the electronic switches (S1, S2) and has one input to which a stop signal is applied, with the stop device (St) preventing the electronic switches from being switched on for as long as the stop signal (Wav2) is in the off state, the circuit arrangement has a timer (Ti) which is coupled to the input of the stop device (St) and produces the stop signal (Wav2), which can assume an on state and the off state, and the circuit arrangement has a trigger device (Tr) which in each case emits a trigger signal (Wav1) to the timer (Ti) after the ringing time has elapsed, but at the latest when the load current (IL, WavIL) becomes zero, wherein the timer (Ti) switches the stop signal (Wav2) to the on state if it receives the trigger signal (Wav1) and retains the on state for the duration of an on time.

2. The circuit arrangement as claimed in claim 1, characterized by the following features:

a threshold value device (Sc), which compares the current through the half-bridge arrangement or the load current (IL) with a current limit value, and emits an interrupt signal if the detected current is greater than the current limit value, the timer (Ti) has an interrupt input, to which the interrupt signal is fed, as soon as an interrupt signal is applied to the interrupt input, the stop signal (Wav2) immediately changes to the off state.

3. The circuit arrangement as claimed in claim 1, characterized in that at least the function of the timer (Ti) is provided by a microcontroller.

4. The circuit arrangement as claimed in claim 1, characterized in that the reactance network includes the series circuit formed by a lamp inductor (L3) and a resonant capacitor (C2), and lamps (Lp) can be coupled in parallel to the resonant capacitor (C2).

5. The circuit arrangement as claimed in claim 1, characterized in that the electronic switches (S1, S2) are bipolar transistors.

6. The circuit arrangement as claimed in claim 1, characterized in that the feedback device (Rk) includes a feedback transformer, whose primary winding (L1c) is connected in series with the lamp inductor (L3), and whose secondary windings (L1a, L1b) supply a control current for the electronic switches (S1, S2).

7. The circuit arrangement as claimed in claim 1, characterized by the following features:

the circuit arrangement has a temperature measurement device, which injects a temperature measured variable into the timer (Ti) which is proportional to a temperature which is relevant for operation of the circuit device or of the lamp, the timer (Ti) switches the stop signal (Wav2) to the on state if it receives a trigger signal (Way 1) and retains the on state for the duration of an on time which the timer (Ti) sets as a function of the temperature measured variable.

8. The circuit arrangement as claimed in claim 1, characterized by the following features:

the circuit arrangement has a measurement device (Me) which injects a controlled variable into the timer (Ti) during lamp operation, which controlled variable is proportional to the power or to the current of a connected lamp (Lp), the timer (Ti) sets the on time as a function of the controlled variable.

9. The circuit arrangement as claimed in claim 8, characterized in that the controlled variable is amplified by a control amplifier.

10. The circuit arrangement as claimed in claim 8, characterized by the following features:

a selection switch (Wa), which has one output which is connected to the timer (Ti) in such a way that it can determine the on time, the selection switch (Wa) has at least two inputs, with the controlled variable being injected into the first input and with a second input being coupled to a first device for time presetting (Z1), in which case this device can preset the on time for the timer for a starting mode, the selection switch (Wa) is controlled by a sequence controller such that the output of the selection switch (Wa) is coupled to the first input during lamp operation, and the output of the selection switch (Wa) is coupled to the second input during the starting mode.

11. The circuit arrangement as claimed in claim 10, characterized in that the on time for the starting mode or ignition mode is chosen such that it is shorter than one quarter of the period duration of the resonant frequency of the reactance network, calculated from the zero crossing of the load current (IL).

12. The circuit arrangement as claimed in claim 10, characterized by the following features:

the starting mode comprises a preheating mode and an ignition mode, the first device for time presetting (Z1) presets the on time for the ignition mode for the timer (Ti), the selection switch has a third input, which is coupled to a second device for time presetting (Z2), with this device presetting the on time for the preheating mode for the timer (Ti), the selection switch (Wa) is controlled by a sequence controller such that the output of the selection switch is coupled to the second input during the ignition mode, and the output of the selection switch is coupled to the third input during the preheating mode.

13. The circuit arrangement as claimed in claim 12, characterized in that the on time for the preheating mode is chosen such that the value of the oscillation frequency of the half-bridge arrangement is more than 1.5 times the resonant frequency of the reactance network.

14. A method for starting and operation of lamps (Lp) having a circuit arrangement as claimed in claim 12, characterized by the following steps:

for the duration of a preheating time, the on time is set such that the oscillation frequency of the half-bridge arrangement has a value which is more than 1.5 times the value of the resonant frequency of the reactance network, for the duration of an ignition time, the on time is set such that the oscillation frequency of the half-bridge arrangement has a value which is sufficiently close to the value of the resonant frequency of the reactance network that a connected lamp is caused to ignite, after ignition of the lamp, the on time is controlled by a controlled variable.

15. The circuit arrangement as claimed in claim 12, characterized in that the on time for the starting mode or ignition mode is chosen such that it is shorter than one quarter of the period duration of the resonant frequency of the reactance network, calculated from the zero crossing of the load current (IL).

* * * * *